(12) United States Patent
Fleischman

(10) Patent No.: US 6,507,847 B1
(45) Date of Patent: Jan. 14, 2003

(54) HISTORY DATABASE STRUCTURE FOR USENET

(75) Inventor: Robert M. Fleischman, Concord, NH (US)

(73) Assignee: Openwave Systems Inc., Redwood City, CA (US)

(*) Notice: Subject to any disclaimer, the term of this patent is extended or adjusted under 35 U.S.C. 154(b) by 0 days.

(21) Appl. No.: 09/465,743

(22) Filed: Dec. 17, 1999

(51) Int. Cl.[7] .............................................. G06F 17/30
(52) U.S. Cl. .............................. 707/101; 707/8; 707/10; 707/102; 707/104; 707/203; 707/204; 707/201
(58) Field of Search ............................ 707/8, 10, 101, 707/102, 104, 201, 203, 204; 395/200.48

(56) References Cited

U.S. PATENT DOCUMENTS

| | | | |
|---|---|---|---|
| 5,717,919 A | * 2/1998 | Kodavalla et al. | 707/8 |
| 5,778,388 A | * 7/1998 | Kawamura et al. | 707/203 |
| 5,835,718 A | * 11/1998 | Blewett | 395/200.48 |
| 5,857,181 A | 1/1999 | Augenbraun et al. | 707/2 |
| 5,873,084 A | 2/1999 | Bracho et al. | 707/10 |
| 5,877,759 A | 3/1999 | Bauer | 345/339 |
| 5,878,233 A | 3/1999 | Schloss | 395/200.55 |
| 5,884,282 A | 3/1999 | Robinson | 705/27 |
| 5,893,911 A | 4/1999 | Piskiel et al. | 707/10 |
| 5,905,863 A | 5/1999 | Knowles et al. | 395/200.36 |
| 5,915,249 A | 6/1999 | Spencer | 707/5 |
| 5,924,072 A | 7/1999 | Havens | 705/1 |
| 5,953,528 A | 9/1999 | Sullivan | 395/703 |
| 5,953,732 A | 9/1999 | Meske, Jr. et al. | 707/513 |
| 5,963,208 A | 10/1999 | Dolan et al. | 345/357 |
| 5,974,417 A | 10/1999 | Bracho et al. | 707/10 |
| 5,987,460 A | 11/1999 | Niwa et al. | 707/6 |
| 5,987,480 A | 11/1999 | Donohue et al. | 707/501 |
| 5,995,105 A | 11/1999 | Reber et al. | 345/356 |
| 6,012,067 A | 1/2000 | Sarkar | 707/103 |
| 6,016,475 A | 1/2000 | Miller et al. | 705/1 |
| 6,023,684 A | 2/2000 | Pearson | 705/35 |
| 6,141,664 A | * 10/2000 | Boothby | 707/201 |
| 6,266,667 B1 | * 7/2001 | Olsson | 707/10 |

* cited by examiner

*Primary Examiner*—Charles Rones
*Assistant Examiner*—Thuy Pardo
(74) *Attorney, Agent, or Firm*—Fulbright & Jaworski L.L.P.

(57) ABSTRACT

A database structure is disclosed that is particularly suited to Usenet servers. The database is thread-hot, synchronized, and highly parallel. In addition, the database structure enables high speed read/write activity with low latency search processes. The database is statically sized, self-expiring, and self-reparing. No throttling or down-time is required in the normal course of operations. The database is accompanied by several caches to provide a system capable of high perfomance Usenet operations. The invention comprises a "key-value" database, several pointers, linked lists, locks, and queues. All of these elements are arranged to operate in a synergistic manner to achieve a highly efficient history database. Under normal conditions, most of the queries from newsfeeds can be satisfied from a cache of the latest history database entries because many of the newsfeeds will offer the same articles as the other newsfeeds. The same cache also provides space in which to store and aggregate the latest additions to the database such that both "read" and "write" operations to the disk are optimized.

28 Claims, 3 Drawing Sheets

HISTORY DATABASE STRUCTURE FOR USENET

BACKGROUND OF THE INVENTION

1. Field of the Invention

The present invention relates to computer hardware and software, and more particularly to a system and method for maintaining a history database of newsfeeds to a Usenet server.

2. Description of the Prior Art

Usenet is a worldwide collaboration network of servers that support newsgroups. There are many thousands of newsgroups, each covering a particular topic of interest to users. Each server administrator can decide which newsgroups to support, usually based on the requests of the local users who wish to read and contribute material to particular newsgroups. Postings on newsgroups can consist of any form of digital data, but are referenced herein generically as "articles" or "news articles."

In contrast to the World Wide Web, Usenet is a forum that allows many people to collaborate with many of their peers in the same interest group. Instead of a single user downloading a web page, a Usenet participant can observe a thread of discussion from many different people. When a Usenet participant posts an article, that article will similarly be accessible to each of the participants in the newsgroup.

Usenet is also distinguishable from e-mail transmissions and chat rooms. Newsgroups allow readers to choose their topics of interest. Unwanted articles and messages do not clutter mail in-boxes. As people post new articles or respond to previous articles, those new postings get added below the prior articles to form a stream of discussion.

When a new article is posted on a newsgroup, the originating server sends a copy of the article to each networked server that has requested "newsfeeds" in that particular newsgroup. Since Usenet is a worldwide network, it is possible that a new article could be copied thousands of times and migrate to distant servers. Many Usenet servers are networked to multiple servers, and might therefore receive newsfeeds containing the same article from different sources.

Usenet is generally transmitted using a protocol called NNTP (Network News Transfer Protocol). Special newsreaders are required to post, distribute, and retrieve Usenet articles. Newsreaders are widely available in freeware, shareware, and commercial versions, and are included in certain versions of Microsoft Internet Explorer and Netscape Navigator.

Internet Service Providers (ISPs) have been under popular pressure to provide access to Usenet. The volume of news feeds to servers has increased dramatically, resulting in difficult technological challenges for ISPs to maintain appropriate levels of service to users. High performance servers are now required, along with innovative algorithms, in order to handle the volume of articles that are posted on the various newsgroups.

One of the most difficult challenges relates to a system and method for maintaining an index of articles that are stored on a particular server. This index is herein called a history database because it is a database that maintains a historical record of articles that have been offered by newsfeeds as downloads to the server. As previously mentioned, a single server may be receiving newsfeeds from dozens or hundreds of other servers. Each newsfeed sends a steady stream of queries regarding the status of newly posted articles. If the article is not yet resident on a local server, the newsfeed will download the article so that each local server has an updated discussion thread.

Servers must continuously find storage space for the new articles that arrive through its newsfeeds. Once the storage capacity of a server is filled, the alternatives are to add another storage device to the server, or to delete older news articles or less popular newgroups. Due to the expense of adding large amounts of storage, the usual practice is to delete older news articles, as appropriate, to free storage for the new incoming articles. The history database is updated continuously to reflect these changes.

Since articles are passed from server to server in unpredictable ways, it is common to have the same article offered by multiple newsfeeds. Therefore, it is important for each news server to maintain a history database of articles that are currently resident on the server. In that way, servers can refrain from continuously downloading articles that have already been provided by other newsfeeds. However, the process of reading, writing, and maintaining such a database has been a challenge to software engineers. What has been desired by server administrators, and provided by the present invention, is a system for maintaining a history database in a Usenet server that allows continuous high speed, low latency access for read and write operations.

SUMMARY OF THE INVENTION

A system for storing and operating a history database is disclosed that is particularly suited to Usenet servers. The history database is thread-hot, synchronized, and highly parallel. In addition, the database structure enables high speed read/write activity with low latency search processes. The database is statically sized, self-expiring, and self-repairing. No throttling or down-time is required in the normal course of operations.

The invention comprises a "key-value" database, several pointers, linked lists, locks, and queues. Portions of the structure are sometimes known as a "hash table on disk," although the present invention is an improvement on such previously known data structures. All of these elements are arranged to operate in a synergistic manner to achieve a highly efficient history database. Under normal conditions, most of the queries from newsfeeds can be satisfied from a cache of the latest history database entries because many of the newsfeeds will offer the same articles as the other newsfeeds. The same cache also provides space in which to store and aggregate the latest additions to the database such that both "read" and "write" operations to the disk are optimized.

BRIEF DESCRIPTION OF THE DRAWINGS

A more complete understanding of the present invention can be obtained by considering the following detailed description of the preferred embodiments thereof in conjunction with the accompanying drawings, in which.

DETAILED DESCRIPTION OF THE INVENTION

The present invention is a system and method for operating a history database on a server. The history database contains searchable records of metadata, or other indexes, related to news articles that have already been offered to a server. Most of the articles are stored on the server, but in certain instances the history database will be updated with metadata on articles that are currently being downloaded. The history database does not contain the complete contents of the news articles themselves, rather it contains information, or metadata, about the existence and location of the news articles. The news articles are stored within a separate article database.

The history database is typically used for two purposes: (1) newsfeeds can determine whether to send a copy of an article to the server; and (2) users can determine if an article is locally available on the server. It is possible to make the same determinations without a history database by checking the contents of the article database directly. However, the article database may contain a terabyte (or more) of data, and therefore it would be prohibitively inefficient to perform direct searches into the contents of the article database. This is particularly true in light of the large number of queries that typically get sent to a server, which can be in the range of hundreds or thousands of queries per second.

Figure 3:
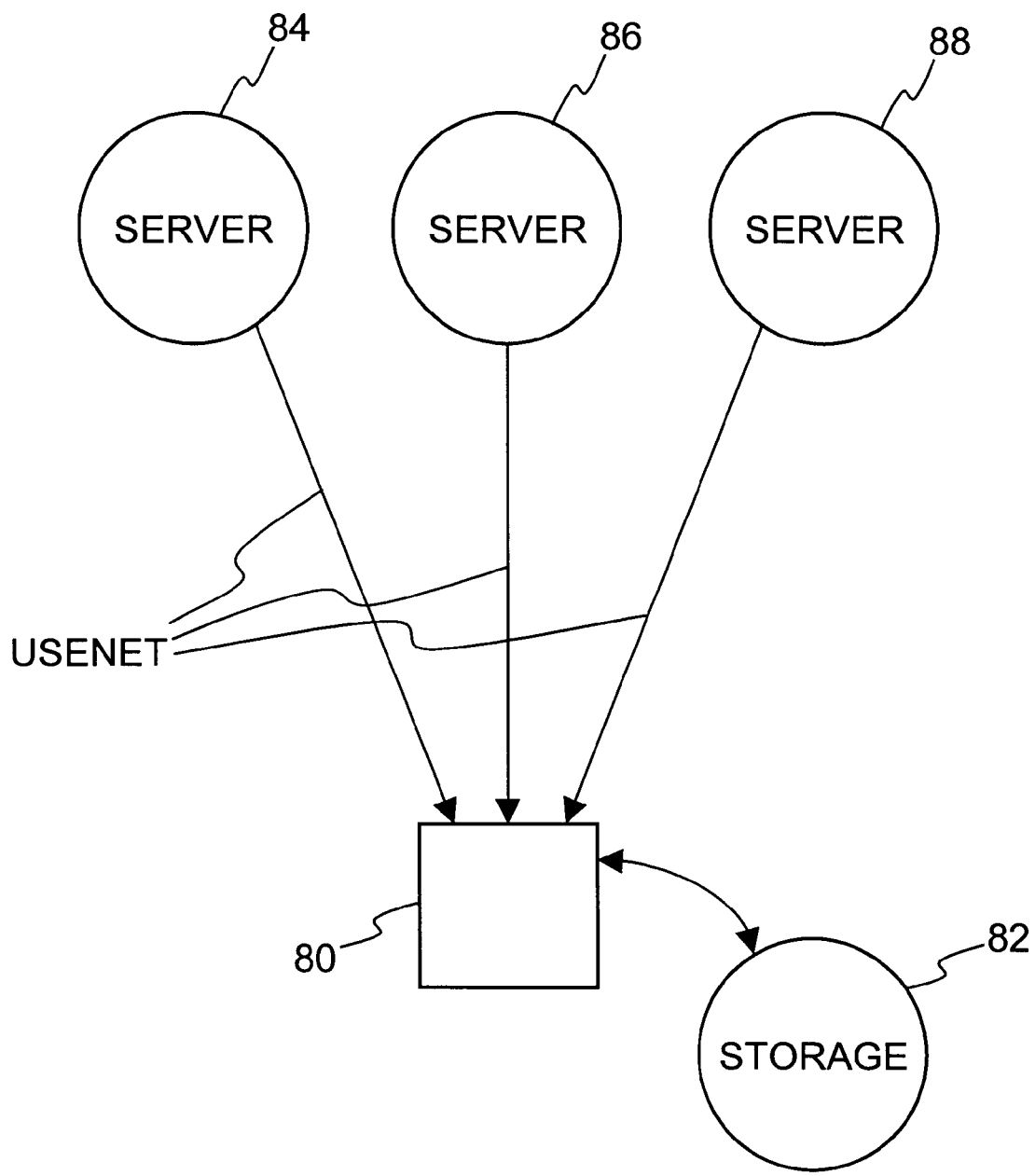
FIG. 3 is a schematic diagram which demonstrates the general nature of Usenet.

The nature of the problem solved by the present invention can be further understood by reference to FIG. 3. The present invention resides within Usenet server 80, which has a large-capacity storage device labeled 82. Although storage device 82 is shown schematically as a separate element in FIG. 3, it will be understood that the storage device 82 may be integral with the server 80, or it may be networked to the server 80. Any means of connecting a storage device, and any type of digital storage device, is intended to be within the scope of this invention. The large-capacity storage device 82 contains the article database, whereas the history database of the present invention is a relatively smaller database that preferably resides within the server 80. The preferred embodiment of the invention is to locate the history database within a relatively fast storage device, whereas the article database may be relatively slow. It is possible to have both the article database and the history database within the same storage device 82 without departing from the scope of this invention.

Server 80 receives newsfeeds from many sources, shown schematically by the lines originating from servers 84, 86, and 88. As described herein, the newsfeed servers 84, 86, and 88 transmit numerous queries regarding the contents of the storage device 82. In particular, the newsfeed servers 84, 86, and 88 offer their latest contents to the server 80. If the article is not already present in device 82, then the article will be downloaded to server 80 and stored on device 82. In many cases the newsfeed servers 84, 86, and 88 will offer the same article, thereby requiring the server 80 to have mechanisms to avoid downloading the same article twice from different newsfeeds. To accomplish these objectives, the server 80 has a history database that contains an index of all articles that are resident on the storage device 82. The history database of the present invention can be used for responding to newsfeed inquiries, as well as responding to inquiries from Usenet users regarding the contents of the storage device 82. Note, again, that the history database of the present invention is not the same as the much larger article database that actually stores news articles in device 82. The history database contains metadata corresponding to the articles in the articles database. Where the general term "database" is used herein, it will be understood to reference the history database of the present invention, and not to the article database.

In the preferred embodiment, a function exists that can test any news article identifier (ID or id) against the contents of the history database to determine whether the article should be added to the database. In the example herein, that function is called "Add( )" and it takes as a parameter the ID of the news article being offered. Of course, the name of the function is arbitrary, and the number of parameters that are passed to the function can be increased without departing from the scope of the invention. Also, the term "function" is used to describe certain preprogrammed logic, although the equivalent logic could be implemented in a procedure, an object, or other programming construct.

The Add( ) function is typically used by newsfeeds that offer the latest articles to downstream servers. Usenet users would typically employ a different function, for example called "Exist(ID)", to query whether an article exists on the server. One of the important differences between these two functions is that an Exist( ) function is not required to hold a lock on the database, since no modifications to the database will result from such a query. In contrast, an Add( ) function may have to modify the database by adding a record if the article is not located within the database. Modifications to the database will require locks to prevent "read" operations from conflicting with an ongoing "write" operation. As described below, one of the benefits of the data structure of the present invention is the large number of concurrent threads that can execute within the database without conflicting with each other.

Both the Add( ) function and the Exist( ) function are Boolean, although other data types can be equivalently employed. In the Boolean embodiment, the Add( ) function returns either a "true" A "false" indicator. A "true" indicator means that the ID has not been found in the history database, in which case the article should be downloaded and referenced in the history database. A "false" indicator means that a download is not required. Practitioners will recognize that the definitions of "true" and "false" can be reversed with equivalent effectiveness.

Many news servers receive over one million new articles every day. Furthermore, the news servers are networked together, and in some cases may have over a hundred news feeds. News servers are typically designed to offer new articles to each of its networked neighbors—thereby becoming news feeds. In some cases, servers are offered over one-hundred million news article from multiple different servers, many of which are duplicates. Certain popular servers may have over a billion such offers per day. With large numbers of news offers to test, the server must have a very efficient history database so that the Add( ) function can be performed quickly and reliably.

In addition to the large numbers of Add( ) functions that must be processed through the server, users will be continuously querying the database to look for articles. The same database that services the Add( ) function calls must also service the numerous Exist( ) function calls. Both operations can co-exist in the database of the present invention without interference, as described more fully below.

Practitioners will recognize that comparing each ID against a linear-stored list of IDs would be an inefficient way to test each ID that is offered to the server. Even with high-speed processors and fast storage devices, searching through such a long list with every Add( ) function call would be prohibitively slow. The present invention provides a structure that can be searched more efficiently than a linear-list.

If only one Add( ) function could be performed at a time, the number of requests would quickly backlog and overwhelm the system. One of the desirable properties of the present invention is that the database is "thread-hot." This terminology refers to a design which can handle multiple search requests into the database at the same time. Each search request, which preferably comes in the form of a function call to the Add( ) function, is considered a "thread." Therefore, the history database can service multiple calls to the Add( ) function at the same time.

Another aspect of the invention is "parallelism", which is closely related to the concept of being thread-hot. The data structure of the present invention is highly parallel, meaning that a very large number of threads can be executing simultaneously within the database. The term "simultaneously" is used in a context known to programmers similar to "multi-threading" i.e. multiple threads do not execute in a perfectly simultaneous manner unless the server has parallel processors. Instead, the threads normally share the resources of a single computer processor. In the present invention, each of the large number of calls to the Add( ) function will make forward progress in reading the database. Of course, if a new ID needs to be written to the database, part of the database may be subject to a "lock" as further described herein.

While parallelism describes the number of threads that may be searching the database, an important related measure is the speed with which each thread finishes its task. Obviously, the structure of the database must be such that each individual search is completed quickly—also known as "low latency." The present invention has a low latency period for completion of each call to the Add( ) function.

In order to achieve low latency, the process of reading and writing to storage must be done in a manner that is most efficient for the computer hardware. For example, multiple small "read" or "write" commands to a disk drive are very inefficient and slow. Spinning media, such as magnetic or optical disks, are more efficient when blocks of data can be processed in adjacent portions of storage.

Caching blocks of data in high-speed temporary storage allows the present invention to get maximum benefit from the hardware characteristics by avoiding unnecessary disk operations. In the Usenet environment, it is likely that the latest download will be quickly followed by multiple offers for the same downloaded article. This is because many networked servers will be receiving the same article and offering it "downstream" at approximately the same time. Therefore, by storing the latest downloads in a cache, many Add( ) function calls can be avoided by first checking the ID against a small high-speed cache. Such a cache is likely to have a very high hit-rate, thereby saving disk operations.

Another property of the present invention is that the database is "synchronized." This means that only one copy of each unique news article will be accepted by the server. For example, with many news feeds continuously offering news articles to the server, it is possible that two or more news feeds will offer the same article (having the same ID) at virtually the same time. The present invention will only accept one of the offers, and reject the others. This scenario occurs because the latest articles get passed from server to server very quickly, and each time a server downloads a new article, it is offered to other servers that are networked together. Therefore, the latest articles are likely to be offered by numerous news feeds within a short time-frame.

The total storage allocation for a history database is static in many Usenet servers. Even when the storage allocation is dynamic, there is typically an upward limit on the amount of storage that can be employed in the database. As new articles are downloaded to the server, and the new article IDs are added to the database, the storage allocation in the history database will fill up. When the database approaches its size limit, many systems are designed to halt operations in the database, purge the oldest entries, and then resume database operations. This results in a "see-saw" profile of storage retention. This type of behavior is also known as "throttling." As explained in detail below, the present invention has a self-expiring feature that avoids throttling or down-time, and thereby avoids the resultant "see-saw" pattern of retention that is characteristic of many present systems. The advantage is that the present system can make maximum use, at all times, of the total storage allocated to the database. The present invention provides a history database that does not require any down-time for rebuild or maintenance. Additionally, a one-hundred percent usage of allocated storage allows the same functionality to be carried out in a smaller amount of dedicated storage than purging-type systems, and further results in more efficient operations. Because the present invention avoids throttling, the database is always available for making queries—i.e. read/write operations. There are no down-times associated with clean-up and purging operations.

One of the contingencies of database operations is that part of the database may have to be repaired. Data may become corrupted due to bad input or accidentally overwriting portions of storage. In many systems, the database would have to be taken off-line in order to repair the damage prior to resuming operations. One of the beneficial characteristics of the present operation is that the database is self-repairing. If data appears to be corrupted, there is no need to take the database off-line. The database can continue to process read/write operations without compounding the problem. Over time, the database will repair itself by over-writing the corrupted entries.

Figure 1:
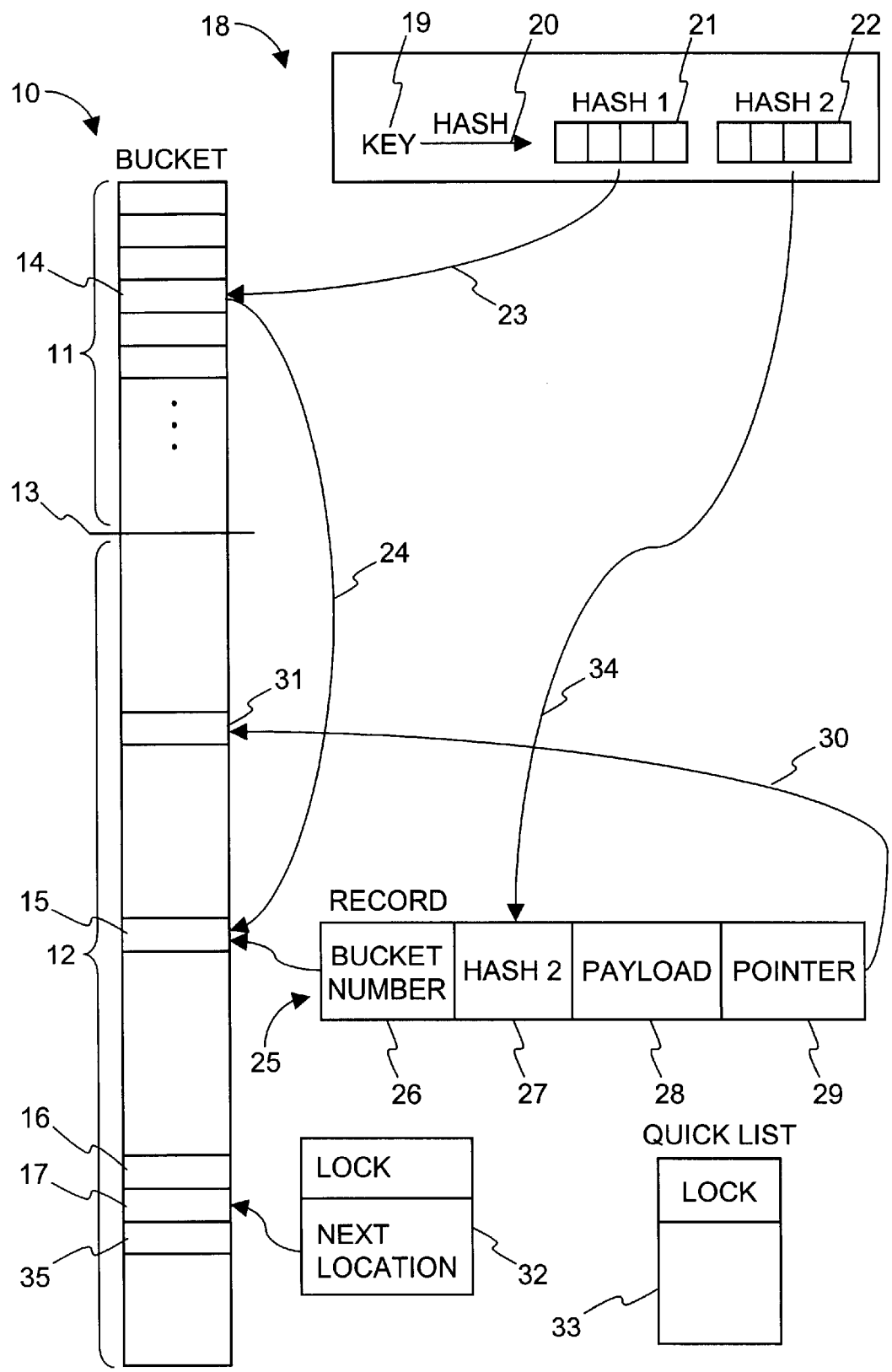
FIG. 1 is a schematic diagram of a history database according to the present invention.

The structure of the present invention can be further understood by reference to FIG. 1. The history database of the present invention is generally labeled 10 in FIG. 1. History database 10 is a "key-value" database, and not a standard relational database structure. The ID of a news article is the key. Each key has a value which is passed as a parameter to the Add( ) function, which is further described herein. The Add( ) algorithm can be described generally as follows: (1) check the database to learn whether the news article is already on the server; (2) if not, add the article to the database and request a download; (3) if the article is already listed in the database then decline the download.

In, the preferred embodiment, a portion of storage within the server is reserved for the database 10. The storage is statically sized, as previously described, which avoids the computational overhead and complexity associated with dynamically sized databases. This helps speed the operation of the history database.

A first portion of the database, shown generally as 11 in FIG. 1, is divided into segments, or "buckets." A typical bucket is labeled 14. In one embodiment, there are several million such buckets, and the exact number is a mere implementation detail of the present invention. A second portion of the database, generally labeled as 12, is reserved for records. A typical record is labeled 15. There may be storage for several million such records, and the exact number is an implementation detail which depends upon the size and general capacity of the server. A dividing location 13 may exist between the bucket section 11 and the record section 12. Practitioners will recognize that sections 11 and 12 may or may not be adjacent storage locations for every embodiment of the invention. Practitioners will also recognize the utility of having statically sized sections 11 and 12, as previously described.

When a newsfeed server (or a Usenet user) makes an inquiry to the history database 10, the particular inquiry is referenced by a key. The key is transformed using a hash function, as shown generally by block 18 of FIG. 1. The hash function is shown schematically by transformation arrow 20. Many hash functions are well-known in the art and may be equivalently substituted into the present invention. In the preferred embodiment, the key 19 is transformed into two, thirty-two-bit words shown as 21 and 22 within block 18. The two words 21 and 22 are not identical, and are arbitrarily labeled Hash 1 and Hash 2. It will be noted by practitioners that the size of each hash word 21 and 22 is chosen in association with the size of history database sections 11 and 12, respectively, and that not necessarily all of the bits associated with each hash word 21 and 22 need to be used by the algorithm.

In the preferred embodiment, the first 22 bits of Hash 1 are used to identify a particular bucket (note that in this preferred embodiment there are 2 raised to the $22^{nd}$ power number of buckets in section 11). This is shown by line 23 which extends from hash 1, 22, to the corresponding bucket 14. Each bucket, including bucket 14 in this example, contains a pointer to a particular record in section 12. This is shown by arrow 24. A "pointer" is a term of art in computer science which is sometimes called a "reference" because it refers to something (for example, a location in memory).

The general strategy is to check only the records within section 12 that have hashed to the particular bucket from section 11. In this way, only a relative few of the records within section 12 need to be checked in order to verify whether a particular article has already been logged into the history database 10. All of the records that hashed to a particular bucket are linked together in a linked list. For example, each record contains a pointer that points back to the previous record that hashed to the same bucket. In this manner, the bucket is set to point to the most recently inserted record, which in turn points to the next oldest record, and so on. The linked list can be followed until the oldest record has been checked. The search terminates if the article is found within any of the records. Linked lists are known within the field of computer science and can be implemented in many different computer programming languages.

As previously described, a typical record is shown at 15, and is expanded generally at 25 in FIG. 1. The second hash number, Hash 2 which is labeled 22 in FIG. 1, is used to uniquely identify a particular article. The value of Hash 2 is stored within a record at 27, as shown by line 34. A typical record 15 also contains a bucket number, 26, which corresponds to the bucket identified by Hash 1 from its corresponding original key 19. A record also contains a payload, 28, which is preferably used to identify a storage location in an article database, such as shown as 82 in FIG. 1, and which contains the news article identified by the Hash 2. A record also contains a linking pointer, 29, which is set to point to the previously stored record that hashed (in Hash 1) to the same bucket number. In this manner, the records can point to each of the other records within section 12 that correspond to the same bucket number. Practitioners will recognize that a typical record may contain other information, and may contain information, or fields, arranged in a different order than shown generally at item 25 in FIG. 1.

Accordingly, each bucket within the value-section 11 will have a corresponding linked list of records within the record-section 12. Each linked list will be arranged so that the most recently added record (that hashed to its respective bucket) will be the "head" of the list, and each record will be linked to the next older record. Each bucket will have a pointer that is reset with each new record so that the pointer always points to the head of the linked list. In this manner, the linked list of records starts with the newest record, which is the head of the list, and progresses to the oldest record. The oldest record within each linked list is a candidate for being over-written by new additions to the history database.

The database is augmented by a small portion of storage that is called a "lock" table, also referenced herein as a "quicklist" and shown schematically as item 33 in FIG. 1. This table keeps track of all IDs that are currently being searched in the database. Recall from the description in FIG. 3 that multiple newsfeeds may offer the same article. Since many offers for the same article will appear in close succession, it is preferable to first check the lock table to determine whether the article is currently being checked in the database. If so, then no further checking into the database is required. Since a thread is currently in the process of checking the entry to the database, the Add( ) function can immediately return a value indicating that the server does not need to download the article. Even if the server does not currently contain the article, the prior thread will handle that contingency by adding the article. The lock table is part of the invention that allows for the synchronization feature, as described above, and helps improves the speed and latency. The lock table is also important because it allows the system to support a high level of parallelism.

In the preferred embodiment, the lock table will contain a list of hashed identifiers that are currently being checked in the database. Each call to the Add( ) function will first compare the hashed value against the lock table. If the value is not present, then the hashed value is added to the lock table and the algorithm proceeds to check the database. Since the lock table is very small compared to the size of the database, and because of the high hit rate associated with this form of cache, the lock table can significantly improve performance of the server.

In the event that an Add( ) function has already checked the Lock Table and the hashed value is not present, the next step is preferably to check the "bucket" associated with the Hash 1 value (or a specified portion of Hash 1). Each bucket contains a pointer, which is a commonly known device in the computer science field that "points" to another location in storage, which in the present invention is in section 12 of the database 10. If the appropriate bucket points to "zero" or "null", as would be the case when the database is initially being populated, then the Add( ) function can immediately determine that the article is not yet in the database. It will be understood by practitioners that zero or null are commonly used to initialize data structures, and that many forms of initialization can be equivalently used. In the more general case, the bucket will contain a valid pointer, and the Add( ) function follows the pointer to the designated storage location in the "record" portion 12 of the database 10 and reads that record 31, as shown by line 24 in FIG. 1.

In the preferred embodiment, the pointer within each bucket will point to the most recent (youngest) record that (1) hashed to that particular bucket, and (2) was previously added to the database in section 12. A "Next" pointer (having a lock) is shown as 32 in FIG. 1, and is pointing at a record designated by 17. Each time a new record is added to the database 10, it is added at the location pointed by the Record pointer 32, and the Record pointer 32 is then incremented to point to the next sequential record in the database, shown at 35. When the Record pointer 32 reaches the "bottom" of the records in section 12, the Record pointer 32 is reset to point to the "top" of section 12. In this manner, the most recently added record is always located just above the location referenced by the Record pointer 32, shown as record 16 (or, if the Record pointer 32 is pointing at the top of section 12, then the most recent record will be at the bottom of section 12). Similarly, the Record pointer 32 will always point to the oldest record (meaning, longest persisting record) in Section 12. Therefore, when new records are added to section 12, the oldest record will be over-written.

Continuing with the algorithm, the Add( ) function compares its Hash 2 value with the Hash 2 value stored in the second field 27 of the record. If the two values match, then the algorithm has the indication that the article already exists on the server, and therefore the search may terminate. If the Hash 2 values do not match, the Add( ) function follows the pointer at the end of that record and proceeds to the next designated record. In the event that the pointer at the end of the current record is zero or null, the Add( ) function can terminate the search with the determination that the article is not on the server (return "true"). However, in a "mature" database—one that has been fully populated—all of the zero or null pointers will have been overwritten and each record will point to another record in the database. At each successive record, the Add( ) function will first check the bucket number of the new record. When the last record associated with a particular bucket has been checked, the pointer will refer to a record that is associated with a different bucket, thereby indicating that all relevant records have been checked. If the Add( ) function checks all of the records associated with the relevant bucket, and no match is found, then the Add( ) function returns a value of "true" and the article is added to the article database and to the history database.

There is one additional test that the Add( ) function performs prior to terminating the search. Under nominal conditions, each record will have a pointer to the next oldest record corresponding to the same bucket. The oldest record associated with that bucket will point to a record that has been overwritten, and in general the overwritten record will have a different bucket number. Thus, the algorithm stops searching when it reaches a record having a different bucket number. However, there is a slight chance that the oldest record will point to a younger record that, by chance, hashed to the same bucket number as the search. That will cause a "loopback" as the pointers continue to point to records having the same bucket number. To avoid an infinite loop, the Add( ) function allows a single "younger" record to be checked, but will terminate correctly on the second occurrence of a younger record, and return a value of "true."

In summary, there are four termination conditions for the Add( ) algorithm: (1) the Hash 2 value is found in a record—return "false"; (2) a pointer in the current record is zero (or null)—return "true"; (3) the pointer in the current record loops backwards (and the path has already looped backward once before)—return "true"; (4) the current record has a different bucket number—return "true."

The following is pseudo-code which is useful for illustrating the programming logic of the Add( ) function:

```
bool add(id)
{
    //Hash the id into 32 bits
    value = hash2(id);
    // Hash the id into 32 bits and grab 22 (or whatever number of them)
    bucket = grab22bits( hash1(id) );
    // Check a small list of id's in process of being added
    lock(quickList);
    if(quickList.has(value)) {
        unlock(quickList);
        return false;
    }
    unlock(quickList);
    // If the bucket points to someplace start our search
    if(*bucket) {
        // Initialize index
        index = *bucket;
        // Zero out loop count
        loop_count = 0;
        // Save the last entry we were looking at so we can check for loops
        last_entry = *bucket;
        // Zero out the current entry
        entry = empty;
        // Loop searching for a match
        while (index != 0 && loop_count < 2 &&
               getbucket(last_entry) == bucket) {
            // Load the current line so we can look at it
            entry = load_entry(index);
            // If it MATCHES, we are DONE!
            if(entry == value) { return false; }
            // If we point ahead, increment the loop count!
            if(next_entry(index) >= last_entry) { ++loop_count; }
            last_entry = entry;
            index = getpointer(last_entry)
        }
    }
    // If the algorithm reaches this point, we have to Add something
    // Lock and increment "next_index"
    lock(next_index);
    index_to_overwrite = next_index;
    next_index = next_index + 1;
    if (next_index >= database_size) { next_index = start_of_database_area; }
    unlock(next_index);
    save_entry(index, value);
    return true;
}
```

The Exist( ) function is similar to the Add( ) function, except that the Exist( ) function does not have the "quicklist" and the add region.

One of the advantageous aspects of the current invention is that the data structure lends itself to a very efficient caching scheme. As previously mentioned, individual read/write operations to disk are slow and inefficient. It would be desirable to hold the most requested items in a read-cache to avoid multiple disk "read" operations. Similarly, it would be desirable to aggregate the newest data entries into a write-cache that can be periodically flushed by writing the contents into the database. Furthermore, the "write" operation would be improved if the entire contents of the write cache were placed into contiguous portions of disk storage for the history database.

The present invention allows the construction of an elegantly compact data structure which supports both a "read" and "write" cache. This is a great benefit to the operation of a server because it significantly reduces the number of read and write operations to the disk storage system or other memory device that contains the history database. According to the preferred embodiment of the present invention, a single block of RAM can function as both a read and write cache. The use of RAM is suggested only because of its access speed relative to disk storage, and practitioners will recognize that many equivalent forms of cache storage can be employed within the scope of the present invention. The read-cache provides a very high hit rate because it will necessarily contain the newest entries for the database. Due to the nature of Usenet, it is likely that the newest articles will have large numbers of cache hits because the newest articles will likely be offered by multiple news-feeds, resulting in Add( ) function calls. Since the Add( ) function can be programmed to first check the read-cache in RAM, many system calls to the disk drive can be avoided. Similarly, the write-cache will aggregate the oldest database entries because the database is designed to sequentially place the newest entries in the data structure and over-write the oldest entries.

Figure 2:
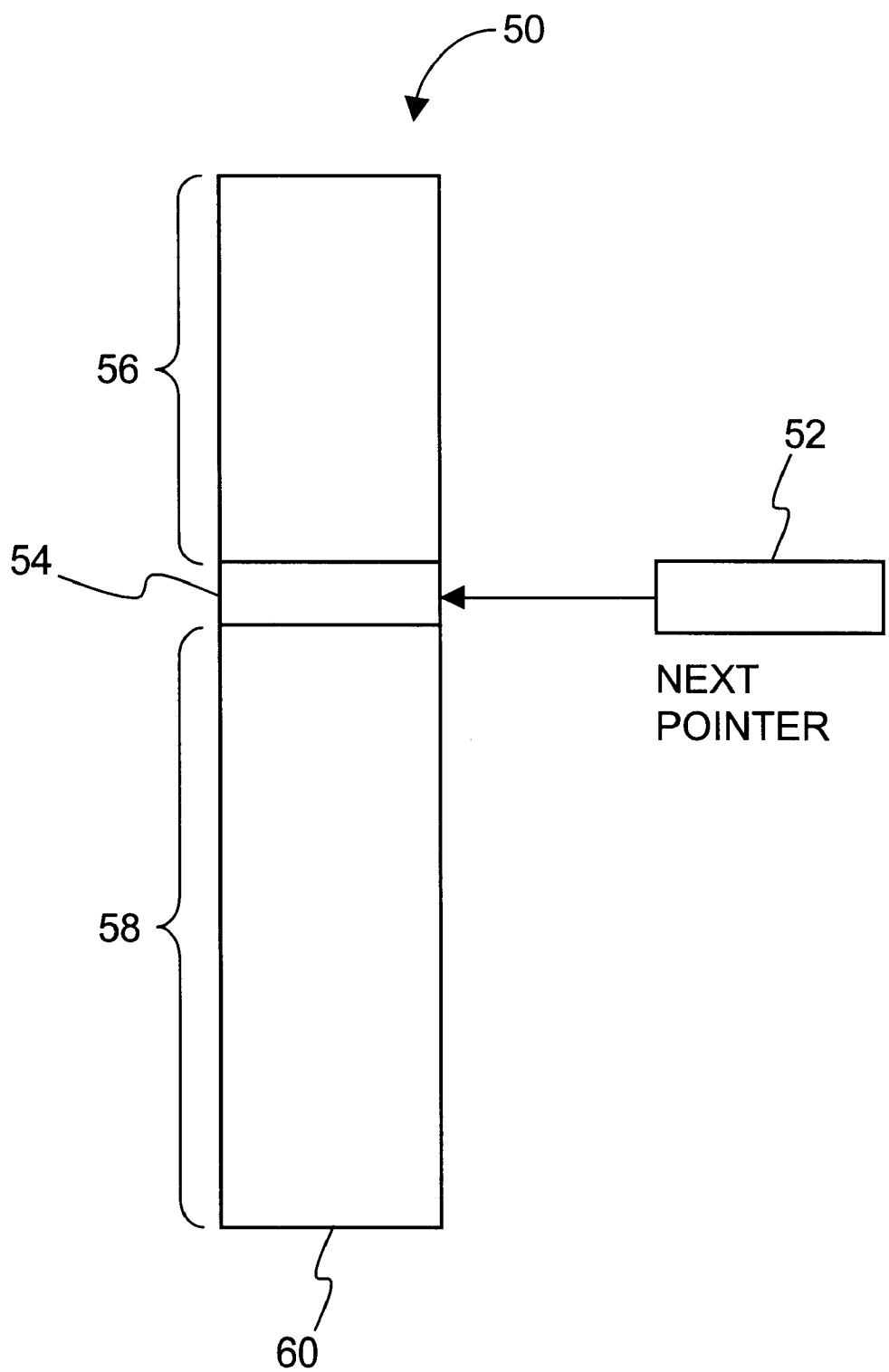
FIG. 2 is a schematic diagram of a portion RAM that has been configured for a read/write cache according to the present invention.

The structure of the record cache 50 will be understood by reference to FIG. 2 and FIG. 1. In the preferred embodiment of the invention, the record cache 50 comprises a 64 k block of RAM that is centered around the "cache pointer" 52. The size of the record cache 50 can be adjusted according to the system characteristics, and the present invention is not intended to be limited by any particular selection of size. In general, a larger cache will have a higher cache hit rate.

The purpose of the record cache 50 is to aggregate both read and write operations in a fast memory device such as RAM storage, and thereby increase the efficiency of operation of the history database 10. The cache pointer, labeled "next pointer" and shown as 52 in FIG. 2, is correlated to the record pointer shown as 32 in FIG. 1. Both pointers, 52 and 32, increment together such that each points to the oldest record in the history database. The cache pointer 52 in FIG. 2 is a pointer to the current location 54 within the record cache 50. In the preferred embodiment, memory addresses above the current location 54 are shown by region 56 and represent the most recent (or youngest) entries to the record section 12 of the history database 10. Memory address below the current location 54 are shown by region 58 and represent the oldest (about to be over-written) record entries in the database 10. The terms "above" and "below" are meant to be relative to the diagram.

As will be further described herein, the portion labeled 56 is the "read" portion of the record cache 50, and the portion labeled 58 is the "write" portion of the record cache 50. As new entries are added to the database, they are first cached into the region 58 by over-writing the oldest entries in the database. Region 58 is thereby an effective "write cache" that prevents multiple and inefficient systems calls to the disk. As each new record is added, the cache pointer 52 moves sequentially downward through the region 58 to always point at the oldest entry in the database. When the cache pointer 52 reaches the bottom of the cache at location 60, the entire contents of the record cache 50 are copied into the database 10 at the corresponding location of the record pointer 32 in FIG. 1.

It will be apparent to the practitioner that this type of disk operation is very efficient because all the disk "write" operations are conducted block-wise in contiguous portions of the database. Since disks are spinning media, a cache flush operation would be very inefficient if individual records from the cache had be saved in various discreet locations on the disk. Instead, the present invention allows the cache to be flushed by writing the entire contents in a sequential manner. This significantly reduces the number of disk operations.

It will also be apparent to the practitioner that the upper portion of the cache 56 contains the newest (youngest) data records that are most likely to be accessed by the Add( ) function. As the cache pointer 52 of the cache moves downward, the number of records in the "read" portion of the cache grows, thereby providing a higher likelihood of a cache hit. In fact, operational systems have demonstrated well over ninety percent cache hit rates under favorable conditions.

Each time the cache is flushed, the newest entries to the database are moved into the upper "read cache" portion 56, which frees the lower portion of the cache for a "write cache" 58. The read cache 56 and the write cache 58 are always separated by the cache pointer 52.

It will be apparent to those of skill in the appertaining arts that various modifications can be made within the scope of the above invention. Accordingly, this invention is not to be considered limited to the specific examples or embodiments chosen for the purposes of disclosure, but rather to cover all changes and modifications which do not constitute departures from the permissible scope of the present invention. Having thus described our invention, what is desired to be secured and covered by Letter Patent is presented in the appended claims.

What is claimed is:

1. A history database for a Usenet server to record the status of news articles, comprising:

(a) a hashing algorithm for producing at least a first hash value and a second hash value from a unique identifier that identifies a news article;

(b) a key-value database comprising a value section and a record section, wherein said value section has a plurality of storage buckets each containing at least a pointer, and wherein said record section has a plurality of linked records and a record pointer; and wherein said unique identifier is hashed to one of said plurality of storage buckets based upon at least a portion of said first hash value, and wherein said pointer within said one of said plurality of storage buckets points to a head of said plurality of linked records, and wherein said second hash value is compared sequentially against said plurality of linked records to determine whether said news article is already recorded in said history database.

2. The system of claim 1, further comprising a quicklist cache for caching currently active threads.

3. The system of claim 1, wherein said key-value database is statically sized.

4. The system of claim 1, further comprising a record cache, having a read portion and a write portion separated by a cache pointer.

5. The system of claim 4, wherein said record cache is configured to cache recently added records.

6. The system of claim 5, wherein said record cache is configured to write recently added records to said key-value database in contiguous areas of storage during each cache flush operation.

7. The system of claim 1, wherein said record pointer incrementally points to records in said record section that have persisted longest within said history database.

8. The system of claim 7, further comprising a lock on said record pointer.

9. The system of claim 1, wherein each of said linked records has a plurality of fields including a first hash field, a second hash field, a payload field, and a linking pointer.

10. The system of claim 9, wherein said linking pointer of each record is set to point at the next most recently added record that hashed to the same first hash value.

11. The system of claim 9, wherein said payload field contains a reference to a location within an article database.

12. A method for operating a history database for a server, comprising the steps of:

(a) receiving a unique identifier at the server;

(b) hashing said unique identifier into at least a first hash value and a second hash value;

(c) mapping said first hash value into a storage location within a value database, wherein said storage location contains at least a record pointer to a linked list of records, said records comprised of at least the following:

(i) a first hash field;
(ii) a second hash field;
(iii) a payload field; and
(iv) a linking pointer; and (d) searching said linked list of records for a match of said second hash value.

13. The method of claim 12, further comprising the step of caching currently active threads in a quicklist cache.

14. The method of claim 13, further comprising the step of locking said quicklist cache.

15. The method of claim 12, further comprising the step of caching the most current records in a read cache having a cache pointer.

16. The method of claim 15, further comprising the step of flushing said read cache in contiguous areas of storage within said key-value database.

17. The method of claim 15, further comprising the step of synchronizing said record pointer with said cache pointer.

18. The method of claim 12, further comprising the step of incrementally pointing said record pointer along said record section to facilitate overwriting records in said record section that have persisted longest within said history database.

19. The method of claim 18, further comprising the step of locking said record pointer.

20. A history database for a Usenet server to record the status of news articles, comprising:

(a) a hashing algorithm for producing at least a first hash value and a second hash value from a unique identifier that identifies a news article;

(b) a key-value database comprising a value section and a record section, wherein said value section has a plurality of storage buckets each containing at least a pointer, and wherein said record section has a plurality of linked records;

(c) a record cache, having a read portion and a write portion separated by a cache pointer and wherein said unique identifier is hashed to one of said plurality of storage buckets based upon at least a portion of said first hash value, and wherein said pointer within said one of said plurality of storage buckets points to a head of said plurality of linked records, and wherein said second hash value is compared sequentially against said plurality of linked records to determine whether said news article is already recorded in said history database.

21. A system for communicating Usenet articles, comprising:

code for receiving an offer to download a Usenet article, wherein said offer comprises a unique identifier of said Usenet article;

code for hashing said unique identifier to a hash memory identifier of a memory location that stores a pointer to a first record of a linked list that maintains a history of selected previously downloaded Usenet articles;

code for searching a lock table to determine whether a previous offer to download said Usenet article is being processed; and code for searching said linked list utilizing said pointer to determine whether said Usenet article has been download, wherein said code for searching said linked list is operable only when said code for searching said lock table determines that a previous offer to download said Usenet article is not being processed.

22. The system of claim 21 further comprising:

code for declining said offer to download said Usenet article when said code for searching said lock table determines that a previous offer to download said Usenet article is being processed.

23. The system of claim 21 further comprising:

code for declining said offer to download said Usenet article when said code for searching said linked-list determines that said Usenet article has been previously downloaded.

24. The system of claim 22 further comprising:

code for accepting said offer to download said Usenet article when said code for searching said linked-list determines that said Usenet article has not been previously downloaded.

25. The system of claim 21 wherein said code for searching said linked-list is operable to stop searching when a last record in said linked-list points to a memory location associated with a different hash memory identifier.

26. The system of claim 21 further comprising:

code for searching a cache that identifies at least Usenet articles that have been recently downloaded, wherein said code for searching a cache is operable after said code for searching a lock table and said code for searching a cache is operable before said code for searching said linked-list.

27. The system of claim 26 where said cache is implemented in random access memory (RAM).

28. The system of claim 27 further comprising:

code for flushing said cache by writing cached information as a linked list that is stored in block-wise contiguous portions of a storage medium.

\* \* \* \* \*